Figure 1:
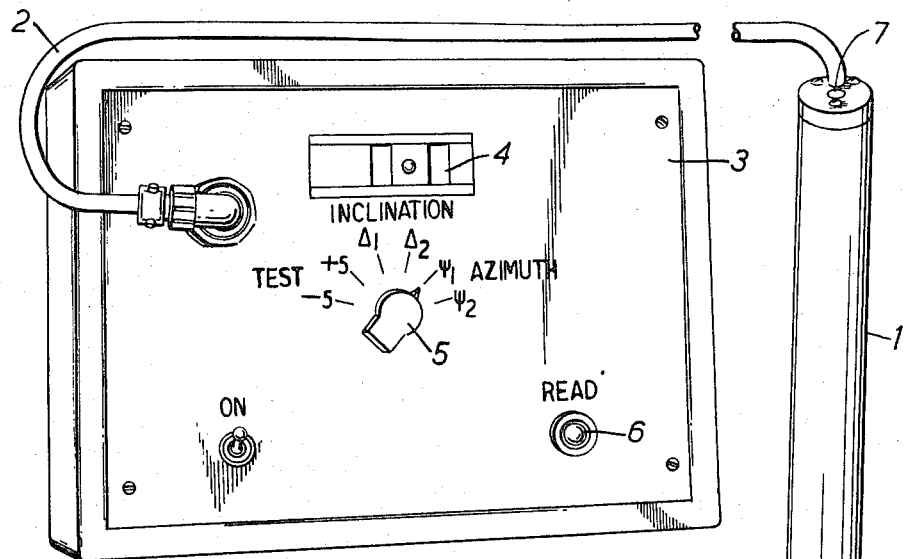

United States Patent [19]

Russell

[11] 3,791,043

[45] Feb. 12, 1974

[54] INDICATING INSTRUMENTS

[75] Inventor: Michael King Russell, Cheltenham, England

[73] Assignee: Scientific Drilling Controls, Costa Mesa, Calif.

[22] Filed: June 9, 1971

[21] Appl. No.: 151,561

Related U.S. Application Data

[63] Continuation of Ser. No. 764,157, Oct. 1, 1968, abandoned.

[52] U.S. Cl. .................... 33/312, 33/313, 33/350, 33/352
[51] Int. Cl. .................. G01c 9/04, E21b 47/022
[58] Field of Search ....... 33/205, 205.5 E, 312, 313, 33/350, 352

[56] References Cited
UNITED STATES PATENTS

| | | | |
|---|---|---|---|
| 2,000,524 | 5/1935 | Kothny et al. | 33/205 |
| 2,466,687 | 4/1949 | Craddock et al. | 33/204 FA X |
| 2,597,125 | 5/1952 | Noxon | 33/204 FA X |
| 2,671,275 | 3/1954 | Burns | 33/204 FA |
| 3,308,549 | 3/1967 | Porter | 33/205 |
| 3,434,219 | 3/1969 | Bowman | 33/205 |

FOREIGN PATENTS OR APPLICATIONS

| | | | |
|---|---|---|---|
| 544,410 | 1/1956 | Belgium | 33/205 |
| 911,242 | 5/1954 | Germany | 33/205 |
| 538,499 | 1/1956 | Italy | 33/205 |
| 545,175 | 6/1956 | Italy | 33/205 |
| 141,501 | 8/1953 | Sweden | 33/205 |

*Primary Examiner*—Robert B. Hull
*Attorney, Agent, or Firm*—Nienow & Frater

[57] ABSTRACT

An inclinometer comprising a sensing unit and a readout unit which in use are remotely connected together through a cable, the sensing unit including two inclination sensors with sensing axes arranged at right angles and associated electronic circuitry to provide output signals which are fed to the readout unit through the cable. Also, along each of three coordinate axes there is provided a magnetic sensor, and the readout unit comprises means for converting AC signals from the inclination and magnetic sensors to DC analog signals whereby both inclination and azimuth of said sensing unit are continuously provided.

9 Claims, 9 Drawing Figures

Patented Feb. 12, 1974

3,791,043

5 Sheets-Sheet 1

INVENTOR
MICHAEL KING RUSSELL
BY
Young + Thompson
ATTORNEYS

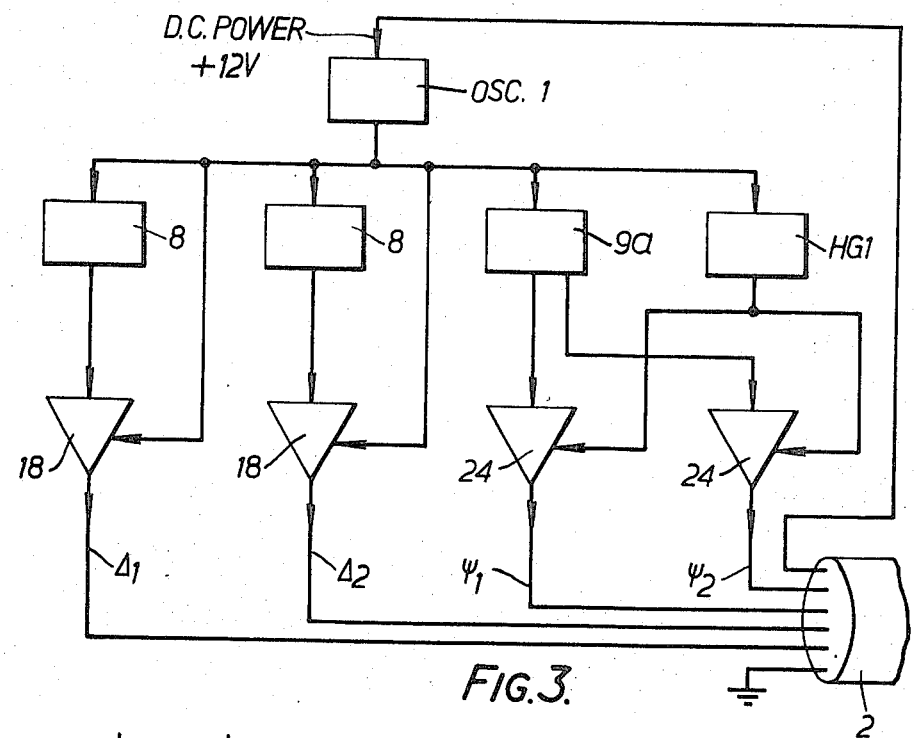
FIG.3.
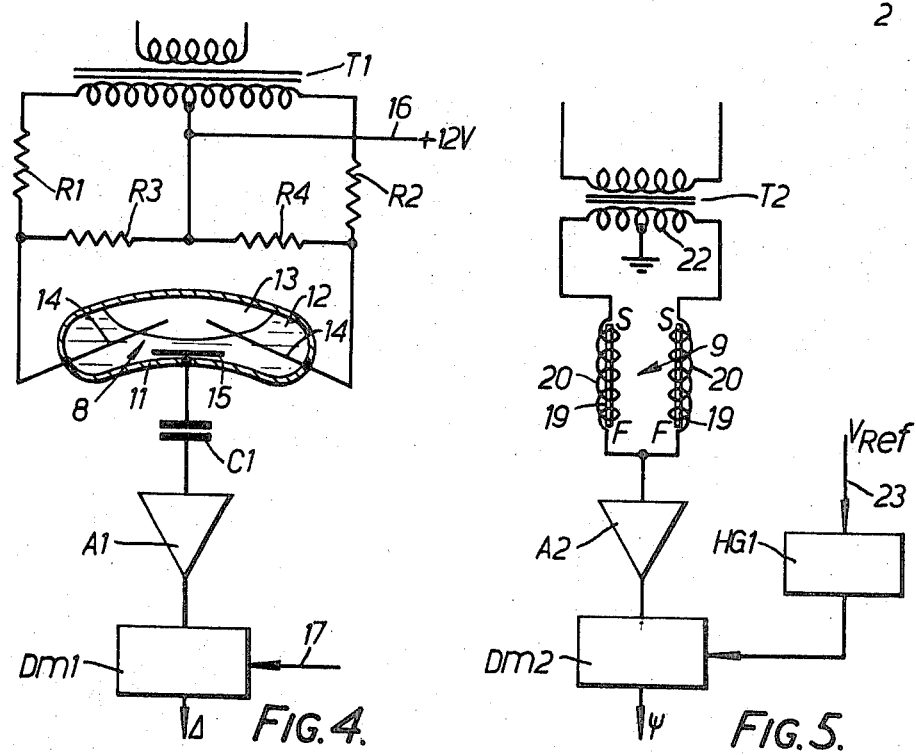
FIG.4.
FIG.5.

INDICATING INSTRUMENTS

This is a continuation of application Ser. No. 764,157, filed Oct. 1, 1968 and now abandoned.

This invention relates to indicating instruments and in particular to inclinometers which provide an indication of the inclination of an axis with which a sensing unit of the instrument is aligned.

The object of the invention is to provide an inclinometer which operates electrically and provides, at a readout unit which is separate from a sensing unit and connected thereto by an electrical cable, an indication of the inclination being measured, the construction being such that remote measurement is facilitated. Another object is to provide such an instrument which is particularly suitable for measuring the inclination and direction of a borehole such as is drilled when prospecting for oil or mineral deposits, or in civil engineering work.

According to one aspect of the invention the sensing unit of an inclinometer includes two inclination sensors arranged at right angles and associated electronic circuitry to provide output signals which are fed to a remote readout unit through a connecting cable. The use of two inclination sensors in this manner enables the component inclination vectors to be measured with respect to the reference axes of the sensors, and this enables calculation of the resultant inclination vector and its angular relationship to the reference axes.

The sensors may be gravity sensitive to enable the inclination with respect to a vertical zero axis to be indicated or determined, in which case they may employ strain gauges to determine the deflection in corresponding perpendicular directions of a weighted cantilever beam, or alternatively they may employ electrolytic switches of known type; in either case the strain gauges or electrolytic switches will normally be connected in a bridge circuit. Alternatively each sensor may be magnetically sensitive and take the form of a fluxgate, whereby to measure the components of the earth's magnetic field along the fluxgate axes, and as a result allow the angular relationship between the instrument axes and the earth's field vector to be determined. It will be appreciated that up to three sensors of one type can be used respectively providing output signals indicative of three mutually perpendicular coordinate measurements with respect to either the earth's gravitational field or the earth's magnetic field, and a particularly versatile instrument results from a mixture of the two types of sensors providing four or five of the total number of six coordinate measurements which are available. In a preferred embodiment, the sensing head includes two mutually perpendicular strain gauge gravity sensors and three mutually perpendicular fluxgate magnetic sensors.

The inclination measurements can also be used to determine the rotation of the sensing unit about the axis of the borehole and with respect to either the gravitational or magnetic fields. This facility renders the instrument particularly suitable for use in directional drilling of deep boreholes which may, for example, reach depths of 20,000 feet when prospecting for oil. To this end the outer casing of the sensing unit may be formed to locate above the drill head, after falling down through the drill tube, in only one relative angular position so that the located angular position of the sensing unit corresponds to that of the drill head. The mathematical basis of the determination of the inclinations and angular position of the sensing unit, from the sensor readings, is described later in this specification.

For measurements of relatively short boreholes, as met with in civil engineering for example, all the electronic circuitry associated with the sensors may be contained in the sensing unit, with the circuitry providing d.c. output signals which are indicated by a suitable meter in the readout unit. These d.c. signals are conveniently voltages with respect to a common ground, and such use of d.c. transmission with a multi-core cable facilitates remote indication as the inductive and capacitive characteristics of the cable present no problem. The indicating voltmeter in this case preferably provides a digital readout, and the readout unit may have a rotary selector switch which connects the different output signals to the meter in turn.

For deep boreholes, down to say 20,000 feet, d.c. transmission along a multi-core cable becomes economically undesirable due to the high cost of a suitable cable. This problem may be overcome by using single core cable, preferably with a conducting outer sheath, and employing pulse code transmission of the sensor data with the cable also carrying a d.c. power supply current to the sensing head. So that the voltage drop along the cable will be compensated a current regulator circuit feeding the cable and in turn feeding the head circuits, may be provided in the readout unit. Repetitive series of pulses may be transmitted and separated by a synchronising time gap, each series commencing with a reference or marker pulse and the spacing of two individual pulses being indicative of the corresponding sensor signal.

In a portable instrument the readout unit meter preferably houses batteries which energise the instrument and are connected to the sensing unit through the cable, and for measuring the inclination of boreholes the sensing unit is desirably housed in a non-magnetic cylindrical case which is slightly less than the minimum diameter of borehole with which the instrument is to be employed. An aluminium alloy case may be used which for maximum protection against scratching and corrosion has a hard anodic finish, and which is fully sealed to allow operation in water. For accuracy the case should not be an unduly sloppy fit in the borehole, and a range of adaptors may be provided which fit on the case and increase its effective diameter for use with various sizes of borehole. For deep boreholes an outer pressure-resistant metal casing may be employed, again of a non-magnetic material so as not to interfere with the magnetic measurements.

As described the sensing unit preferably includes a magnetic sensor in the form of a fluxgate, conveniently two or three mutually perpendicular fluxgates, which are fixed with respect to the measuring axis of the sensing unit. Fluxgates as previously employed in instrument work have not been arranged in this manner but have seen embodied in pendulous fluxgate assemblies so that under the influence of gravity the assemblies take up a position which enables the magnetic field orientation to be determined only in a horizontal plane. Thus according to another aspect of the invention an inclinometer has a sensing unit with a measuring axis the inclination of which is indicated on or can be determined from the indications on a remote readout unit and which includes an inclination sensor which is responsive to the local magnetic field and takes the form of a fluxgate fixed with respect to the measurement axis.

The use of three mutually perpendicular fluxgates enables the resultant of three magnetic field vectors to be computed, thus enabling the local magnetic field to be determined. Although this may be desirable in some circumstances, the arrangement has a more significant advantage in that the sum of the squares of the three fluxgate measurements should be constant unless the magnetic field changes. Thus a running check can be kept on the constancy of the local magnetic field - if there is any change it is reasonable to assume that there is also distortion and hence that the directional readings based on magnetic measurements are likely to be unreliable.

Figure 2:
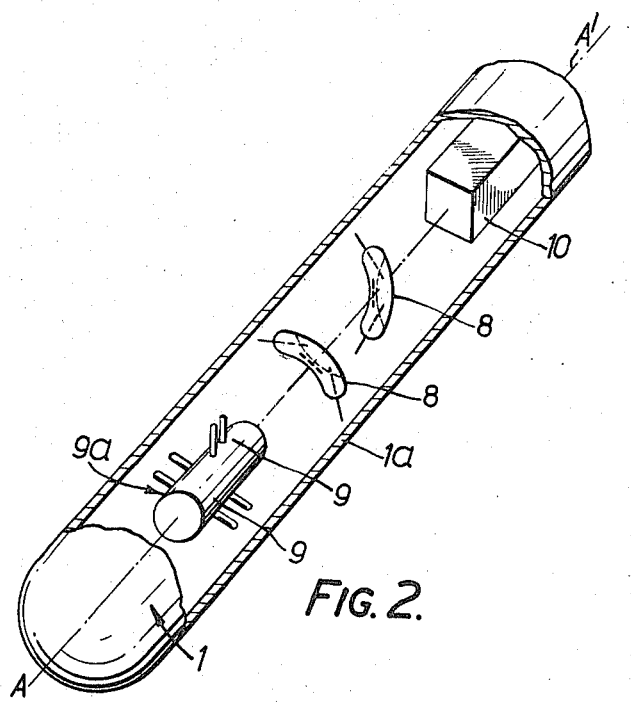
Figure 6:
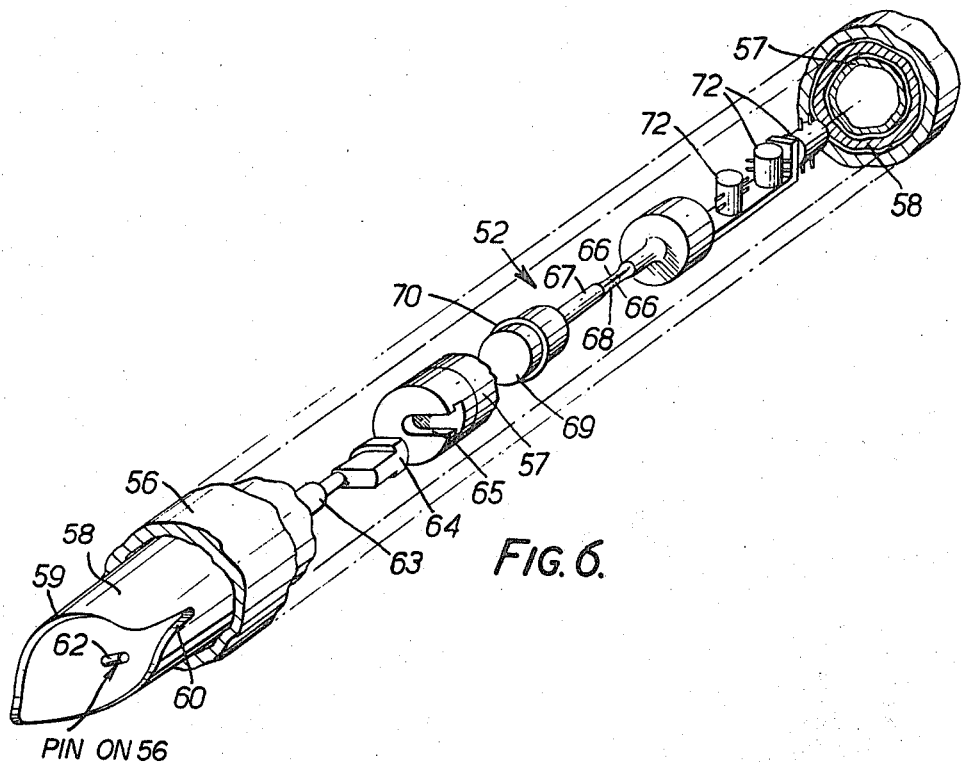
Figure 8:
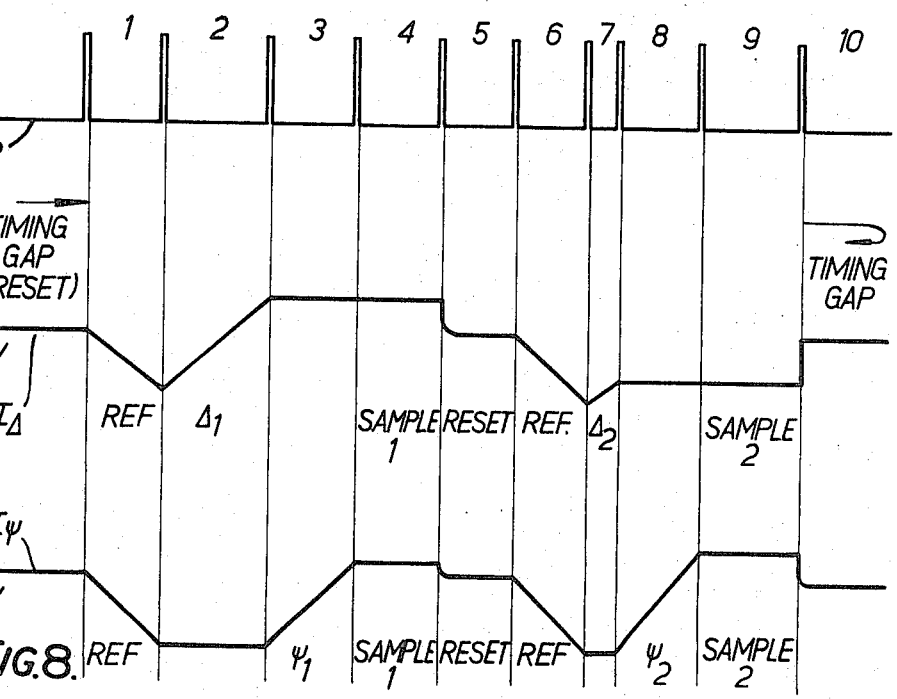
Figure 7A:
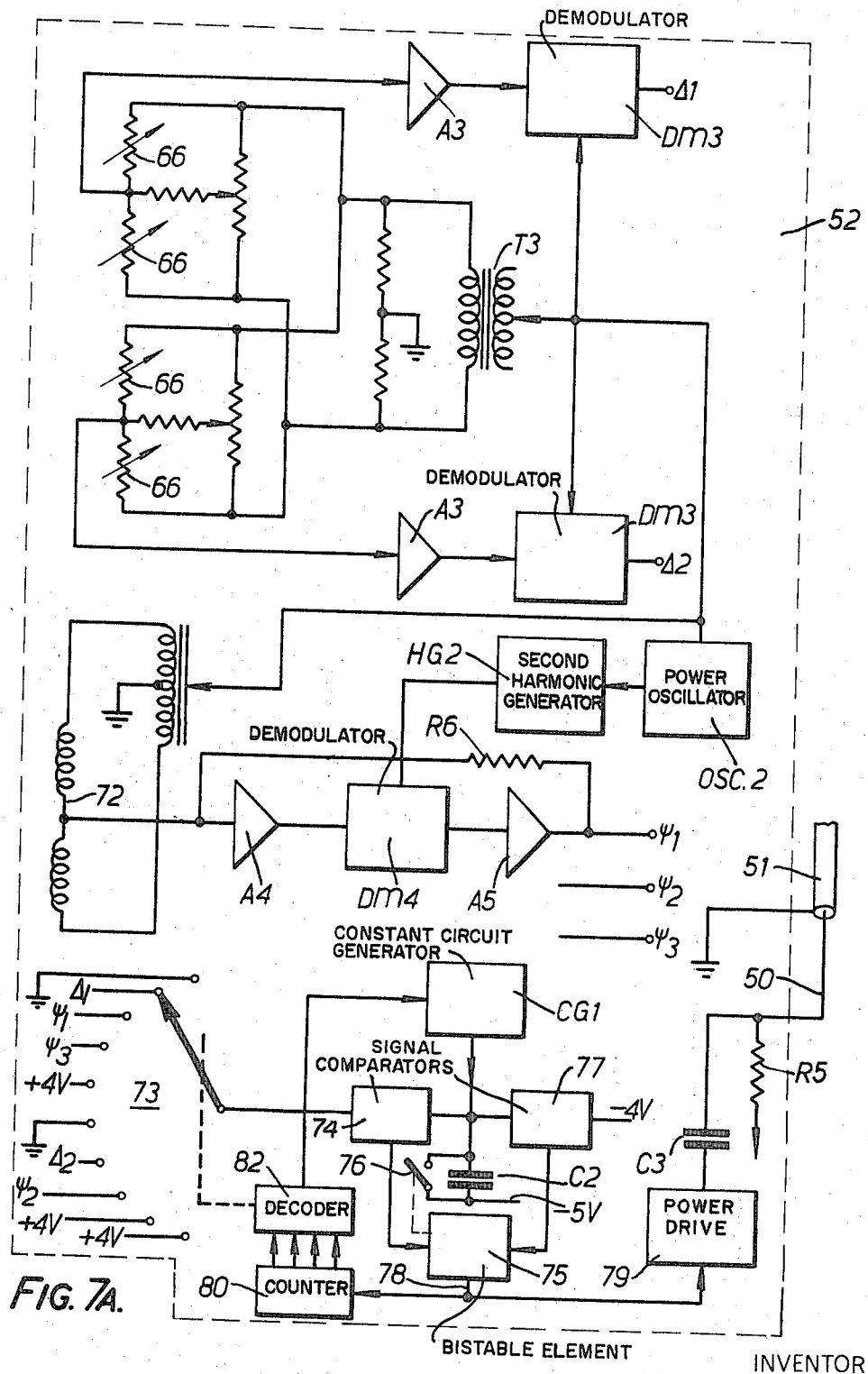
Figure 7B:
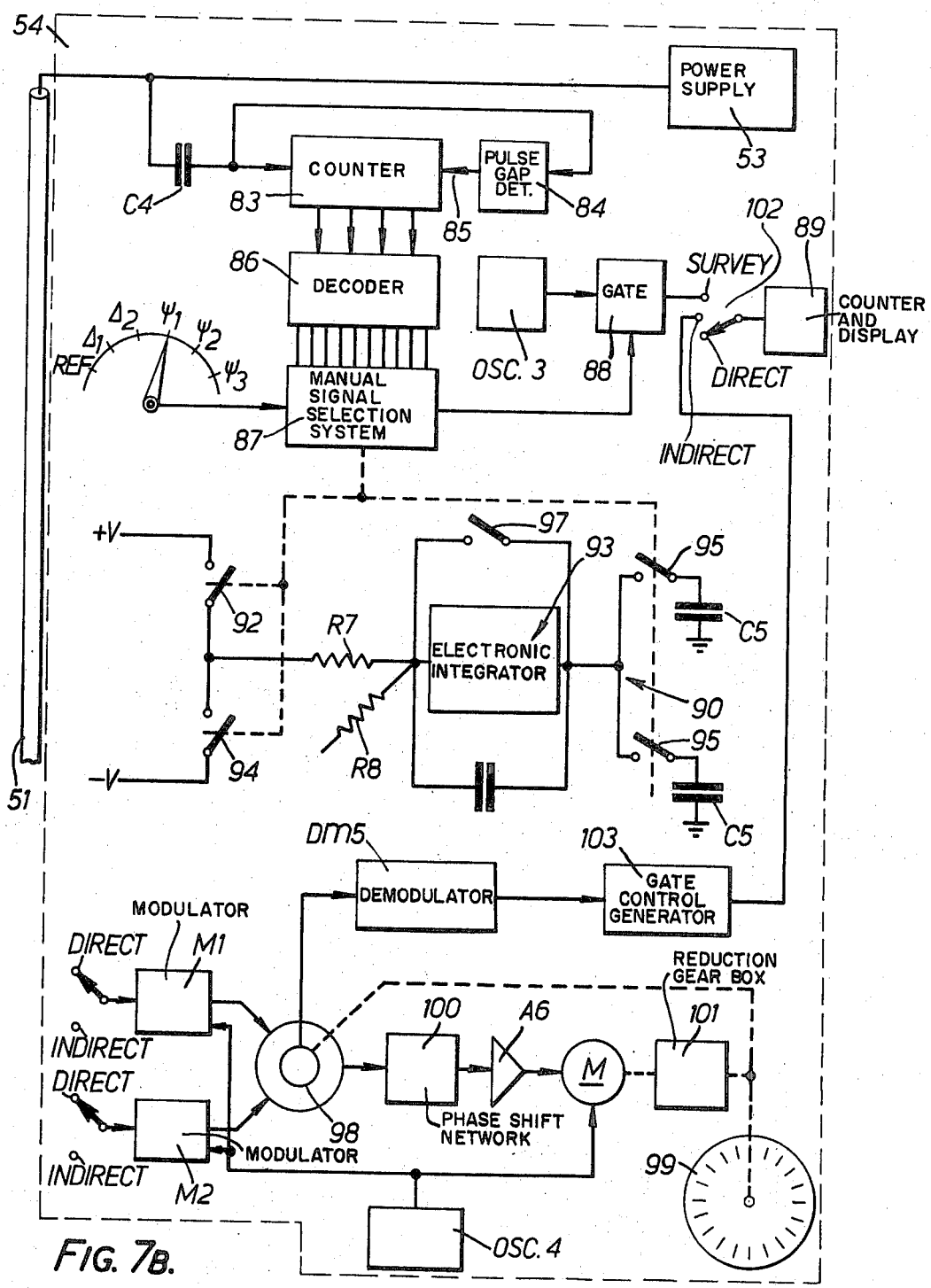

The invention will now be further described with reference to the accompanying drawings which illustrate, by way of example, two borehole inclinometers one of which is designed for use with relatively deep boreholes, for example to a depth of any 20,000 feet. In the drawings:

FIG. 1 is an external view of the complete instrument of the more simple embodiment, FIG. 2 is a partially cut-away view of a sensing unit of this instrument, showing the general internal arrangement in a somewhat diagrammatic manner, FIG. 3 is a corresponding block circuit diagram, FIGS. 4 and 5 are sub-circuit diagrams, partially in block form, FIG. 6 is a view fundamentally similar to that of FIG. 2 but illustrating the second and more sophisticated embodiment for use with deep boreholes, the sensing unit being illustrated in an operative position within a drill collar, and the head 64 being shown disengaged from the slot 65 of casing 57, FIG. 7 comprised of FIGS. 7A and 7B is a somewhat diagrammatic showing of the main current components of this second embodiment, mainly in block form, and FIG. 8 illustrates typical waveforms illustrative of the pulse coded transmission of information which is used between the sensing unit and the remote readout unit of this second embodiment.

The instrument of FIGS. 1 to 5 includes a sensing unit 1 with a cylindrical aluminium alloy casing 1a which can be dropped down the borehole, the inclination of which is to be measured, and is connected through a six-cored cable 2 to a remote readout unit 3. The latter unit embodies a voltmeter providing a digital display at 4 and a rotary selector switch 5 which has two test positions and four measuring positions in which four of the cable cores are respectively connected to the voltmeter. The casing of the readout unit houses dry batteries which supply the sensing unit 1 through the other two cores of the cable, and a "press to read" switch 6 is associated with the voltmeter. The digital display 4 gives easier reading than a conventional moving coil meter and in addition is less likely to be damaged by mechanical shock.

The instrument is designed to be used with nominally vertical boreholes, and at the top or cable end the unit 1 has a threaded bore 7 for fitting a ring bolt for the attachment of a wire cable (not shown) on which it is lowered into the borehole. The sensing unit 1 provides four output signals each of which is dependent upon the inclination of the longitudinal axis A - A1 of the unit 1, which axis can be considered as the measurement axis. Two gravity sensitive sensors of the unit 1 in the form of electrolytic switches 8 (FIGS. 2, 3 and 4) provide two derived signals which are indicated in the respective switch positions as angles Δ 1 and Δ 2 of the vertical direction with respect to the two mutually perpendicular and nominally horizontal axes with which the electrolytic switches are respectively aligned. These switches allow inclinations of up to 5° to be indicated to an accuracy within ±0.3°.

Two mutually perpendicular fluxgates 9 (FIGS. 2 and 5) within the sensing unit 1 provide azimuth output signals, indicated respectively in the other two switch measurement positions $\psi_1$ and $\psi_2$, which are representative of the intensity of the magnetic field along two other mutually perpendicular axes which are also perpendicular to the measurement axis. The two resultant azimuth readings enable the angular position of the measurement axis with respect to magnetic north to be calculated by determining the vector resultant. The fluxgates are mounted in the casing 1a as a sub-assembly, which is indicated at 9a in the block circuit diagram of FIG. 3. The magnetic field and inclination measurements are taken along parallel axes, i.e., the two fluxgates 9 are respectively aligned with the electrolytic switches 8. The associated electronic circuitry is illustrated diagrammatically as a block 10 in FIG. 2, this being operative to provide d.c. output signals representative of the gravity and magnetic measurements, and the electrolytic switch and fluxgate circuits will now be described with reference to FIGS. 3 to 5 merely in sufficient detail for their operation to be understood.

Each electrolytic switch 8 (see particularly FIG. 4) takes the form of a short curved and sealed tube 11 partially filled with the electrolyte 12 and arranged with the air space 13 at the top similarly to a bubble level. End wire electrodes 14 project through the electrolyte 12 and when the tube 11 is level, as shown in FIG. 4, have equal lengths projecting into the air bubble 13. A central electrode 15 which is arranged symmetrically with respect to the electrode 14 is arranged at the bottom so that it is always immersed in the electrolyte 12. The electronic circuitry 10 includes a power oscillator Osc1 with a frequency of 1 kcs. which energises the two electrolytic switch circuits and also the two fluxgate circuits. Each electrolytic switch 8 is connected in a bridge circuit energised from the oscillator Osc1 through an isolating transformer T1 and equal series resistors R1 and R2. Two arms of the corresponding bridge are provided by the impedances between the central electrode 15 and the two end electrodes 14 respectively, and the other two arms are provided by fixed equal resistors R3 and R4. The junction between R3 and R4 and a centre tapping of the secondary winding of T1 are connected by a line 16 to the d.c. power supply, and the central electrode 15 is connected through an isolating capacitor C1 to the input of an a.c. amplifier A1 the output of which forms the input of a phase-sensitive demodulator DM1 which is supplied via line 17 with a reference voltage from the power oscillator, the latter voltage thus being in phase with the bridge energising voltage. The resultant output of the demodulator DM1 is a d.c. voltage Δ proportional to the inclination of the electrolytic switch 8, and the circuit constants are chosen in relation to the sensitivity of the digital voltmeter 4 so that a direct angular reading is provided by the latter. In the block circuit of FIG. 3 each demodulator and amplifier is shown as a unit 18.

Each fluxgate 9 comprises a pair of parallel elements aligned with the fluxgate axis and in the form of magnetic mumetal rods 19 positioned within energising coils which are connected in series and form two arms of a bridge circuit; the relatively remote ends of the coils are connected to the two ends of a secondary winding 22 of a matching transformer T2 driven by the power oscillator Osc 1. A centre tapping of the winding 22 is earthed, so that the two halves thereof form the other two arms of the bridge, and the common ends of the coils 20 are connected to the input of an a.c. amplifier. If neither of the mumetal cores 19 are saturated there is no bridge output fed to the amplifier A2 as the bridge is balanced. With one core 19 only saturated there is a bridge output as the corresponding energising coil 20 is effectively resistive whereas the other is inductive, and after both cores 19 saturate both coils 20 are effectively equally resistive and again there is no bridge output. As the two cores 19 are connected in magnetic opposition the portion of each energising cycle for which only one is saturated will depend upon the magnetic field strength along the fluxgate axis. Thus the width of the bridge output pulses is a function of the magnetic field strength along that axis. The applied voltage is chosen to be sufficient to drive the cores 19 into saturation approximately halfway through each half-cycle, and as saturation accurs twice per cycle the output has a strong second harmonic component. The main second harmonic component of the input to the amplifier A2 is amplified thereby and fed to a phase-sensitive demodulator DM2 which is supplied with a second harmonic reference voltage from a second harmonic generator HG1 powered at 23 by a reference voltage derived from the power oscillator Osc 1. The resultant output of the demodulator DM2 is again a d.c. voltage $\psi$, which in this case is proportional to the intensity of the magnetic field in the direction of the fluxgate axis. In respect of the fluxgate circuits, each demodulator and associated amplifier is illustrated as a unit 24, the generator HG1 being common to both these circuits.

As the outputs of the demodulators DM1 or DM2 are phase sensitive their sign, i.e., positive or negative, enables the angular quadrants in which the inclinations lie to be determined with respect to fixed instrument coordinates. The resultant inclinations, with respect to the vertical and the earth's magnetic field, can be determined by simple graphical resolution if the local value of the earth's magnetic field is known.

As the instrument of FIGS. 6 to 8 is intended for use down to depths of the order of 20,000 feet the transmission of d.c. signals up a multi-core cable is no longer economical, and as an alternative, pulse coded transmission of the sensor information is used along a central copper core 50 of a cable 51 by which the sensing unit 52 is in use suspended. This cable has an outer steel sheath in the form of a double-wrapped rope which is grounded and insulated from the core 50 by nylon insulation. The core and sheath are also used for the transmission of d.c. power to the sensing unit 52, this being supplied from a constant current power supply 53 in the remote readout unit 54 to which the upper end of the cable 51 is connected. Thus the sensing unit is supplied with a constant supply current whatever the effective length and resistance of the cable 51, and the power supply for the sensing circuits is provided at a constant voltage as the sensing circuits are of constant resistance, and these circuits are supplied from the cable 51 through a resistor R5. This resistor presents to the output signals an adequate impedance and the cable is not short circuited to the signal pulses. At all positions other than full depth the cable 51 is partly wound on a drum, and hence the effective d.c. resistance of the outer sheath is reduced.

The first embodiment was developed from the viewpoint of measuring the inclination and azimuth direction of the borehole, whereas the FIGS. 6 to 8 embodiment was further developed on the basis that the same measurements can be used to determine the angular position or "roll" angle of the sensing unit with respect to the axis of the borehole. It is important to be able to determine this angular position when employing directional drilling, whereby to achieve the appropriate positioning of the directional drilling tool. To this end it is important to ensure that the sensing unit 52 will locate within the drill collar 56 (FIG. 6) in one position only. An alumium casing 57 of the sensing unit is contained within a pressure casing 58 of non-magnetic material, this outer casing being necessary in view of the hydraulic pressure encountered at the depths concerned, and the casing 58 has a leading end 59 of shoe-like formation presenting inclined guide surfaces which lead to a locating slot 60. When the sensing unit is dropped into the drill tube it falls down the latter and enters the drill collar 56, which is also of non-magnetic material, and the end 59 engages an inwardly projecting pin 62 on the collar 56. This results in the casing 58 being guided so that the pin 62 enters the slot 60 to fix the angular location of the unit 52 within the collar 56. To protect the sensors from excessive shock resulting from deceleration of the pressure casing 58 as the latter seats home in the drill collar 56, the inner casing 57 is connected to the pressure casing 58 through a shock absorber assembly 63. This has a T head 64 which engages a reference T slot 65 at the forward end of the casing 57, whereby to ensure correct angular alignment of the two casings.

Two gravity sensitive sensors are again provided, but in this case they utilise four strain gauges 66 respectively associated in pairs in bridge circuits as shown in FIG. 7. These strain gauges detect the deflection of a pendulous cantilever beam 67 which is aligned with the measurement axis, i.e., the longitudinal axis of the sensing unit 52, and which has a reduced neck portion 68 of square cross-section. The two strain gauges of each pair thereof are respectively attached to opposite side faces of the square section neck, whereby to provide a bridge output dependent on the deflection of the beam in a corresponding direction at right angles to the measurement axis. Thus, the two pairs of strain gauges 66 provide for measurement of two components of inclination disposed mutually at right angles. The beam 67 is firmly anchored within the casing 57 at the end adjacent the reduced neck 68, and at the other end a weighted pendulum portion 69 has a surrounding rubber buffer ring 70 which has clearance with the casing 57 and engages the latter to prevent undue deflection of the beam 67 under shock forces. It will be seen from FIG. 7 that as with the earliest embodiment each strain gauge sensor provides a d.c. output signal $\Delta$, the bridge being supplied from a 1,000 c.p.s. power oscillator Osc2 through an isolating transformer T3, each circuit including an a.c. amplifier A3 and demodulator Dm3.

Three mutually perpendicular fluxgates 72 are now mounted side by side along the measurement axis within the casing 57. As before the fluxgates are driven from the oscillator Osc2, the fluxgate bridge output being amplified by an amplifier A4 and demodulated by a phase-sensitive demodulator Dm4 supplied with a second-harmonic reference voltage from a second-harmonic generator HG2 powered from a reference voltage derived from the power oscillator. As a refinement the demodulator d.c. output signal is applied to the input of a high gain d.c. amplifier A5 the output of which is fed back to the fluxgate via a feedback resistor R6. The feedback current produces a magnetic field in the fluxgate which is in opposition to the external magnetic field, and due to the externally high gain of the amplifier A5 a stable condition is reached with the current feedback field substantially equal and opposite to the external magnetic field. As the feedback field is dependent solely on the feedback current and the feedback resistor R6 is fixed, the output voltage of the amplifier A5 is proportional to the external magnetic field component aligned with the fluxgate axis. Three identical circuits of this nature are provided respectively associated with the three fluxgates 72, the advantage of this arrangement being that the measurement scale factor depends only on the fluxgate winding geometry - which determines the feedback field for a given feedback current - and the value of the feedback resistor. Both these elements are very stable and hence the accuracy of the magnetic sensor measurement signals $\psi 1$, $\psi 2$ and $\psi 3$ is extremely high and stability is unaffected, for example, by any drift in amplifier gain.

The object of the pulse code transmission circuit, the main components of which are illustrated in block form in FIG. 7, is to produce a train of pulses with the time between the pulses proportional to the d.c. $\Delta$ and $\psi$ signals. As the d.c. measurement voltages may be either negative or positive, it is essential to be able to distinguish the d.c. sign while the time intervals must of necessity be positive. In order to achieve this the circuit defines a reference time gap which corresponds to a zero d.c. signal, time intervals shorter than this defining negative d.c. signals while time intervals longer than the reference time define positive d.c. signals.

The basic elements used to define the time intervals are a linear voltage ramp and signal comparator circuits, each time interval being the time taken or the voltage to rise from a constant negative reference level, for example - 4v, to the $\Delta$ or $\psi$ voltage level concerned. In order to transmit the pulsed information sequentially the d.c. signals are selected in turn by means of a solid state switch, which is of a form known per se, and which selects ten inputs in turn. As marked in FIG. 7A, the first and sixth inputs are connected to earth, the fifth, ninth and tenth inputs are each supplied with a constant signal of +4v, and the sensor $\Delta$ and $\psi$ outputs are connected to the other five inputs. A sweep capacitor C2 is supplied from a constant current generator CG1 so that the capacitor voltage increases linearly with time from the negative reference level until it exceeds the input signal level selected by the switch 73. When it exceeds the signal level an upper level signal comparator 74 operates, and this toggles a bistable element 75 which in turn operates a switch 76 which discharges the sweep capacitor C2. When the sweep capacitor reaches the negative reference level a lower level signal comparator 77 operates and resets the bistable element 75, thus opening the switch 76. As the discharge time of the capacitor C2 is very much less than any of the charging times an output at 78 from the bistable element circuit 75 appears as a narrow pulse, which is the coding system output, the spacing of consecutive pulses being indicative of the corresponding charging time and hence the input voltages selected. A typical pulse train is illustrated at P in FIG. 8, and the pulses are supplied to a power driver stage 79 to obtain the line pulses which are fed to the cable 51 through a coupling capacitor C3.

The pulses at the bistable output 78 are also fed to a counter 80 associated with a decoder 82 which controls or "steps on" the selector switch 73 so that the production of a pulse at the same time as the capacitor C2 discharges results in the next input signal being selected. The decoder 82 also provides an overriding control for the current generator CG1 which charges the capacitor C2, and on each tenth time interval the charging current is reduced by a factor of three and the +4v signal is connected to the upper level comparator 74. Thus the sweep voltage rate is reduced by a factor of 3, and as the d.c. sensor output signals have a nominal full scale value of ± 3v the resultant time interval is at least three times as long as any of the measured signal intervals and can be used as a synchronising interval to synchronise the readout decoding equipment.

The use of the constant current power supply 53, with the inherent high internal impedance associated with a constant current source, enables the signal pulse to be taken off from the upper end of the cable through a simple coupling capacitor C4, and the pulses are fed to both a counter 83 and a pulse gap detector 84. The circuit of the detector 84 operates as a pulse generator which provides an output pulse at a fixed time interval following an input pulse, and if an input pulse arrives before the output pulse has occurred the pulse generator is restarted. Thus for as long as pulses arrive at the gap detector 84 more frequently than the inherent fixed time interval, i.e., the time delay between receipt of a pulse and the occurrence of an output pulse, then no output pulse will be provided. The gap detector 84 is connected to the counter 83 through a reset line 85 and it operates to reset the counter 83 in order to synchronise the latter with the pulse generator circuits in the sensing unit. To this end the inherent time delay of the gap detector 84 is approximately double that of the longest signal pulse interval providing in the pulse code except the timing gap. As described, each timing gap in the pulse code is about three times the maximum signal interval, and the result is thus that the gap detector 84 provides a pulse about two thirds of the way through each timing gap, and this pulse is used to reset the counter 83 to the tenth position in the pulse series. The counter 83 drives a decoder circuit 86 and the counterdecoder system produces outputs corresponding to the condition of the sensing unit counter 80; these outputs are available to a manual signal selection system 87 which determines the functions that these outputs are to fulfill, as will now be described.

In order to take survey measurements, i.e. to read outputs for the purpose of calculating the borehole inclination and azimuth angles, the transmitted signals are measured as follows. In the appropriate position of a rotary selector switch the signal selection system 87 connects one of the time interval decoding outputs of the decoder 86 to a gate circuit 88 controlling a standard free-running oscillator Osc3. The output of the gate 88 is connected to a counter and decimal readout display unit 89. Thus a digital readout is provided of the number of standard oscillator counts during the time interval corresponding to the signal selector, and standard resetting circuits are employed to prevent the counts adding in the counter of the unit 89. Thus the indicated count is representative of the instantaneous signal time interval.

The rotary selection provided by the system 87 allows any one of the transmitted signal intervals to be indicated as a count by the unit 89, so that the six time intervals concerned - five sensor signals and the reference signal - are read off as decimal numbers and can form the basis for a survey calculation. As already mentioned the reference signal pulse gap corresponds to zero sensor signals, and thus the reference signal readout is subtracted from the sensor signal readouts to give the true positive or negative value of the $\Delta$ and $\psi$ values.

The instrument provides for analogue computation based on the transmitted sensor signals, and in order to achieve this, d.c. analogues of the transmitted signals must first be obtained. This is achieved by means of a switched integrator circuit embodied in the signal selection system 87, the fundamentals of this integrator circuit being illustrated at 90. During the reference time interval a positive supply voltage is connected by an electronic switch 92 to the input of the electronic integrator 93 causing it to slew in a negative sense at a constant rate. At the end of this time interval the integrator thus has a negative voltage proportional to the reference time interval, and during one of the selected signal time intervals an equal and opposite supply voltage is switched by means of a switch 94 to the integrator 93 causing it to slew in the positive sense. Thus, at the end of the signal time interval the integrator voltage is proportional to the difference between the reference and signal time intervals, and is therefore proportional to the corresponding transmitted signal voltage. Sampling switches 95 enable the integrator output voltages to be stored in storage capacitors C5 as d.c. analogues of the transmitted signals, and the integrator is automatically reset to zero, by a reset switch 97, prior to a decoding sequence. FIG. 8 illustrates, at $I_\Delta$ and $I_\psi$ respectively, the integrator output when the $\Delta$ and $\psi$ signals are being decoded.

In a simple form of the circuit only one switch 95 and storage capacitor C5 need be provided, at any time the integrator operating on only one signal interval. However, the instrument as illustrated is slightly more sophisticated in that, as shown in FIG. 7, two sample switches 95 and storage capacitors C5 are provided. The reference time interval is transmitted twice in each complete pulse cycle, at the first and sixth switch positions, and by appropriate control of the switching sequences a pair of signals are obtained from the same integrator 93 by employing two decoding sequences per cycle. Two reset intervals per cycle are used, at the fifth and tenth positions respectively. Thus the circuit can be used to provide simultaneous analogues of $\Delta 1$ and $\Delta 2$, i.e., the gravitational strain gauge sensor outputs, or alternatively $\psi 1$ and $\psi 2$ which are two of the magnetic fluxgate outputs. From a knowledge of $\Delta 1$ and $\Delta 2$ it is possible to determine the roll angle which in the analysis which follows will be identified as $\phi$. For certain computations it is necessary to obtain knowledge of a quantity such as $\psi + \alpha \Delta$, where $\alpha$ is a constant for a given geographical location. To this end a second pair of input switches which duplicate the switches 92 and 94 are provided for the integrator 93, and these are appropriately switched so that the pairs of signals which are stored in the capacitors C5 are each a combination of two signals in the desired form. As shown in FIG. 7 the switches 92 and 94 feed the integrator 93 through a resistor R7, and the resistor R8 which is also shown is associated with the other pair of switches when it is desired to obtain combination output signals. If $R8 = R7/\alpha$ then the outputs will be $\psi 1 + \alpha. \Delta 1$ and $\psi 2 + \alpha. \Delta 2$, which as shown later can be used to determine $\psi + \phi$.

A resolver servo 98, which is a device already known in other applications, is provided in the readout unit 54 to provide a direct indication of rotational angles mechanically computed on the basis of the integrator output signals. The resolver 98 takes the normal form of an a.c. machine with a pair of stator and a pair of rotor windings, the two windings of each pair being arranged physically at 90° to each other and functioning as follows. If two a.c. voltages V1 and V2 are applied to the stator windings and the rotor is turned until one of its windings has zero voltage output then the angle of the shaft of the rotor with respect to the stator reference position will be $\tan^{-1} V2/V1$, and the voltage on the other rotor winding will be proportional to $\sqrt{V1^2 + V2^2}$.

In the present circuit the two d.c. servo input voltages obtained from the integrator, namely $\Delta 1$ and $\Delta 2$ (or $\psi 1 + \alpha. \Delta 1$ and $\psi 2 + \alpha. \Delta 2$) are converted to a.c. voltages by two 1,000 c.p.s. modulators M1 and M2, and these two voltages are respectively connected to the stator windings of the resolver 98. One of the rotor output windings has its output voltage shifted in phase by 90° by a phase-shift network 100 and then amplified by a servo amplifier A6, the amplified and phase shifted voltages being applied to the control winding of a two-phase servo motor M. The reference phase winding of the motor M is supplied from a 1,000 c.p.s. power oscillator Osc4 which also drives the modulators M1 and M2. The mechanical output of the motor M is connected, via a reduction gear box 101, to the rotor shaft of the resolver 98, providing a mechanical feedback which operates to turn the resolver rotor to a position in which a zero output voltage is fed to the servo amplifier. The readout disc 99 is also connected to the shaft of the resolver to indicate the angle directly, and the other rotor winding of the resolver is connected to a demodulator DM5 to give a d.c. output proportional to the amplitude of the resultant vector, i.e. $\sqrt{V1^2 + V2^2}$.

A switch 102 can be turned to a SURVEY position for survey indications by the readout unit 89, to an INDIRECT position or to a DIRECT position. In the INDIRECT position the counter and readout unit 89 can provide a readout which approximates to the inclination angle for angles of less than 20°. As will be clear from the following mathematical analysis, for such small angles $\theta \approx \sqrt{\Delta 1^2 + \Delta 2^2}$ and this readout is obtained in the INDIRECT switch position with the two $\Delta$ inputs to the resolver servo. The rotor output voltage of the latter is demodulated by a 1,000 c.p.s. demodulator DM5, the demodulated output being supplied by a gate-control generator circuit 103 which operates on the gate 88 to provide a gate width proportional to the demodulated signal. Thus the readout unit 54 count is also proportional to this signal, and hence approximately also to $\theta$ for values thereof less than 20°. When the switch 102 is in the DIRECT position the resolver servo is computing from the functions $\psi_1 + \alpha \Delta 1$ and $V_2 + \alpha \Delta_2$. In this position the resultant resolver output $\sqrt{V_1^2 + V_2^2}$ is not used, and the digital angle readout is $\psi + \phi$ as developed below.

For the purpose of completeness a mathematical analysis will now be given of the bias computation of the resultant roll angle, pitch angle or inclination, and heading angle or true azimuth reading utilising the sensor outputs.

1. Definition of axes

The system of axes defined by suffix "0" is earth fixed with $OX_o$ horizontal and directed towards magnetic north, $OY_o$ horizontal and directed towards magnetic east, $OZ_o$ vertical and directed upwards.

Axes OXYZ, with no suffix, are fixed in the body of the survey instrument.

2. Definition of rotations

Starting with OXYZ and $OX_oY_oZ_o$ coincident, OXYZ is rotated about axis OZ by an angle $\psi$, which will be defined as the inclinometer axis AZIMUTH ANGLE.

From its new position, OXYZ is further rotated by the PITCH ANGLE $\theta$ about the axis OY.

The final rotation is again about the axis OZ by an angle $\phi$, which will be defined as the ROLL ANGLE.

3. Co-ordinate transformation matrices

From standard classical mathematics of co-ordinate transformation, the relationship between any vector $\vec{A}_{x_0}$ in the earth-fixed frame and the same vector $\vec{A}_x$ in the instrument frame is $$\vec{A}_{x_0} = [B] \cdot \vec{A}_x$$

where [B] is a three by three matrix defined by the three rotations as follows:

$$[B] = \begin{bmatrix} \cos\psi & -\sin\psi & 0 \\ \sin\psi & \cos\psi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} \cos\phi & -\sin\phi & 0 \\ \sin\phi & \cos\phi & 0 \\ 0 & 0 & 1 \end{bmatrix}$$

$$= \begin{bmatrix} (\cos\psi\cos\theta\cos\phi - \sin\psi\sin\phi) & (-\cos\psi\cos\theta\sin\phi - \sin\psi\cos\phi) & (\cos\psi\sin\theta) \\ (\sin\psi\cos\theta\cos\phi + \cos\psi\sin\phi) & (-\sin\psi\cos\phi\sin\phi + \cos\psi\cos\phi) & (\sin\psi\sin\theta) \\ -\sin\theta\cos\phi & \sin\theta\sin\phi & \cos\theta \end{bmatrix}$$

Alternately, $A_x = [B]^{-1} \cdot A_{x_0}$

Note: for conformal transformations $[B]^{-1} = [B]*$ where $[B]^{-1}$ is the inverse of [B] and $[B]*$ is the transpose of [B].

Thus:

$$\vec{A}_x = \begin{bmatrix} (\cos\psi\cos\theta\cos\phi - \sin\psi\sin\phi) & (\sin\psi\cos\theta\cos\phi + \cos\psi\sin\phi) & (-\sin\theta\cos\phi) \\ (-\cos\psi\cos\theta\sin\phi - \sin\psi\cos\phi) & (-\sin\psi\cos\phi\sin\phi + \cos\psi\cos\phi) & (\sin\theta\sin\phi) \\ \cos\psi\sin\theta & \sin\psi\sin\theta & \cos\theta \end{bmatrix} \cdot \vec{A}_{x_0}$$

4. The Gravity Vector in instrument axes

Let the gravity vector referred to the earth-fixed axes be $$\vec{G}_0 = \begin{bmatrix} 0 \\ 0 \\ -g \end{bmatrix}$$

and the gravity vector referred to the instrument axes be $$\vec{G} = \begin{bmatrix} g_x \\ g_y \\ g_z \end{bmatrix}$$

Then $$\begin{bmatrix} g_x \\ g_y \\ g_z \end{bmatrix} = [B]^{-1} \cdot \begin{bmatrix} 0 \\ 0 \\ -g \end{bmatrix}$$

which when multiplied out gives:

$$g_x = g \sin\theta \cos\phi \quad (1)$$

$$g_y = -g \sin\theta \sin\phi \quad (2)$$

$$g_z = -g \cos\theta \quad (3)$$

Measurements of the components of gravitational force on a mass in the instrument can yield quantities $\Delta_1$, $\Delta_2$ and $\Delta_3$ where $\Delta_1 \propto g_x$
$\Delta_2 \propto g_y$
and $\Delta_3 \propto g_z$ The angles $\phi$ and $\theta$ can then be determined by means of the following expressions:

$$\phi = \tan^{-1}(-g_y/g_x) = \tan^{-1}(-\Delta_2/\Delta_1) \quad (4)$$

$$\theta = \tan^{-1}(-\sqrt{(g_x^2 + g_y^2)}/g_z)$$

$$= \tan^{-1}(-\sqrt{\Delta_1^2 + \Delta_2^2}/\Delta_3^2) \quad (5)$$

(Note: Equation (5) is the one mechanised in the described instrument to yield $\phi$.)

6. The Earth's Field Vector in instrument axes

If the horizontal and vertical components of the earth's field are $H_h$ and $H_v$ respectively, then the field vector referred to the earth-fixed axes is $$\vec{H}_0 = \begin{bmatrix} H_h \\ 0 \\ -H_v \end{bmatrix}$$

Let the field vector referred to the instrument axes be $$\vec{H} = \begin{bmatrix} h_x \\ h_y \\ h_z \end{bmatrix}$$

then $$\begin{bmatrix} h_x \\ h_y \\ h_z \end{bmatrix} = \begin{bmatrix} B \end{bmatrix}^{-1} \cdot \begin{bmatrix} H_h \\ 0 \\ -H_v \end{bmatrix}$$

which when multiplied out gives:

$h_x = H_h \cos\psi\cos\theta\cos\phi - H_h\sin\psi\sin\phi + H_v \sin\theta\cos\phi$ (7)

$h_y = -H_h \cos\psi\cos\theta\sin\phi - H_h\sin\psi\cos\phi - H_v\sin\theta\sin\phi$ (8)

$h_z = H_h \cos\psi\sin\theta - H_v\cos\theta$

Equations (7) and (8) are rearranged as follows $h_x - H_v\sin\theta\cos\phi = H_h \cos\psi\cos\theta\cos\phi - H_h\sin\psi\sin\phi$ (9)

$h_y + H_v\sin\theta\sin\phi = -H_h \cos\psi\cos\theta\sin\phi - H_h\sin\psi\cos\phi$ (10)

Measurements taken in the instrument yeild three quantities $\psi_1$, $\psi_2$ and $\psi_3$ where $\psi_1 \propto h_x$ (11)

$\psi_2 \propto h_y$ (12)

and $\psi_3 \propto h_z$ (13)

From equation (1) and (2), we derive $\Delta_1 \propto \sin\theta\cos\phi$ (14)

$\Delta_2 \propto -\sin\theta\sin\phi$ (15)ps

Substituting in equations (9) and (10) yields $\psi_1 + \beta\Delta_1 \propto H_h (\cos\psi\cos\theta\cos\phi - \sin\psi\sin\phi)$ (16)

$\psi_2 + \beta\Delta_2 \propto H_h (-\cos\psi\cos\theta\sin\phi - \sin\psi\cos\phi)$ (17)

where $\beta$ is a constant Dividing (17) by (16) yields:
$(\psi_2 + \beta\Delta_2)/(\psi_1 + \beta\Delta_1) = -(\cos\psi\cos\theta\sin\phi + \sin\psi\cos\phi)/(\cos\psi\cos\theta\cos\phi - \sin\psi\sin\phi)$
$= -[\tan\phi + (\tan\psi/\cos\theta)/1 - \tan\phi(\tan\psi/\cos\theta)]$
Rewriting $\tan\psi/\cos\theta = \tan\gamma$
$(\psi_2 + \beta\Delta_2)/(\psi_1 + \beta\Delta_1) = -\tan(\phi+\gamma)$
or $\phi + \gamma = \tan^{-1}] - (\psi_2 + \beta\Delta_2)/(\psi_1 + \beta\Delta_1)$ (18)

(This is the equation which is mechanised in the described instrument).

For pitch angles ($\theta$) up to 20° the approximation $\psi \approx \gamma$ gives less than 2° of error.

I claim:
1. An inclinometer comprising in combination;
   a sensing unit comprising a casing having a pair of inclination sensors oriented in fixed relation to the unit and at right angles to each other and a magnetic sensor arranged along each of three space coordinate axes fixed relative to the unit;
   means for shock mounting said sensors within said casing;
   a cable;
   means for delivering to said cable AC signals derived from the outputs of said inclination and magnetic sensors;
   a readout unit for location remotely of said sensing unit and connected thereto by said cable;
   said readout unit comprising means for converting said AC signals to DC analog signals to permit continuous computation of both inclination and azimuth of said sensing unit.
2. An inclinometer according to claim 1 comprising switch means for enabling each of said five sensors to be read independently.
3. An inclinometer according to claim 2 wherein said readout unit comprises a counter and decoder.
4. An inclinometer according to claim 3 wherein said readout unit comprises an electronic integrator for developing a voltage which is proportional to the signal being afforded by any one of said sensors selected by said switch means.
5. An inclinometer according to claim 4 wherein said shock mounting means is connected between said sensors and said outer casing.
6. An inclinometer according to claim 5 comprising means for orienting said sensors in a known position in a remote location.
7. An inclinometer according to claim 6 wherein said inclination sensors comprise strain gauges disposed at right angles to each other and which are associated with a weighted pendulum for sensing gravity.
8. An inclinometer according to claim 7 wherein each of said magnetic sensors is a fluxgate for determining magnetic field strength along a respective one of said three axes.
9. An inclinometer according to claim 8 wherein said casing for said sensing unit comprises a non-magnetic pressure casing for enabling said sensing unit to withstand relatively high hydraulic pressures.

* * * * *